United States Patent Office 3,436,403
Patented Apr. 1, 1969

3,436,403
METHYLENATION METHOD
John W. Cornforth, Sittingbourne, England, assignor to Shell Oil Company, New York, N.Y., a corporation of Delaware
No Drawing. Filed Oct. 12, 1966, Ser. No. 586,036
Claims priority, application Great Britain, Oct. 13, 1965, 43,418/65
Int. Cl. C07d 13/10
U.S. Cl. 260—327                    8 Claims

ABSTRACT OF THE DISCLOSURE

Methylation of an ortho-dihydroxyaromatic compound or a hydroxyaromatic thiol by reaction with a methylene dihalide under alkaline conditions is improved by the use of a aprotic liquid having a dielectric constant, measured at 25° C., or at least 25 as solvent and reaction medium.

---

This invention relates to an improved method for preparing compounds having the essential structure represented by the formula

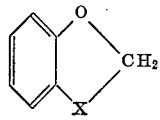

(I)

wherein X represents oxygen or sulfur.

It is well known that compounds having the essential structure represented by the formula:

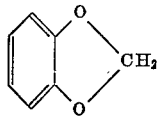

(II)

can be prepared by methylenation of ortho-dihydroxyaromatic compounds having the essential structure represented by the formula:

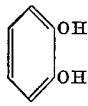

(III)

The products (Formula II) are of value in the preparation of synergists for pyrethrin, organophosphorus and carbamate insecticides.

The method comprises heating together a compound of the Formula III, a methylene dihalide, and an aqueous-alcoholic alkali. The reaction proceeds very slowly, especially where methylene chloride is the methylenating agent, and prolonged heating under pressure is ordinarily required. E. D. Laskina, J. App. Chem., U.S.S.R. 32, 878 et seq. (1959), p. 895 et seq. of the English translation edition, and references cited therein.

It has now been found that in order to obtain optimum yields it is necessary to maintain a high dilution of ions derived from the orthodihydroxyaromatic compound. This, in turn, has introduced the undesirable effect of further markedly increasing the reaction time, which imposes a severe limitation on the value of the method.

However, it has also been found that the rate of the reaction can be markedly increased while maintaining the necessary dilution by carrying out the reaction in a highly polar, aprotic liquid solvent medium.

Further, it has been found that these discoveries are equally applicable to analogs of the compounds of Formula III wherein one of the oxygen atoms has been replaced by sulfur.

Thus, the process of the invention provides compounds that are of value in the agricultural and veterinary fields and are also valuable intermediates for the production of organic compounds useful in the food, cosmetic, pharmaceutical, agricultural and veterinary fields.

Generally speaking, this invention comprises an improvement in the method for the preparation of compounds having the essential structure defined by Formula I by heating together a compound having the essential structure represented by the formula:

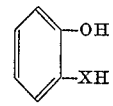

(IV)

wherein X represents oxygen or sulfur and a methylene dihalide under alkaline conditions, the improvement comprising conducing the reaction in the presence of a highly polar, aprotic solvent.

As the compound of Formula IV, there may be used any suitable aromatic compound containing the ortho-arrangement of two —OH moieties, or one —OH moiety and one —SH moiety. The indicated aromatic ring can be unsubstituted, or it can be substituted, or it can form a part of a fused aromatic structure—e.g., a naphthalene structure—which can be unsubstituted or substituted. Suitably, the substituent(s) is (are) alkyl, alkoxy, alkoxyalkyl, formyl, hydroxyl, cyano, halogen or akylsulfinyl.

Typical species of this class of compounds include:

Catechol (pyrocatechol)-1,2-dihydroxybenzene;
3-allylcatechol-1,2-dihydroxy-3-allylbenzene;
Alkyl-substituted catechols, such as 3-methylcatechol, 4-methylcatechol, 3-isopropylcatechol, 3-methyl-5-(1,1,3,3-tetramethylbutyl)catechol, 3,4-, 3,5-, and 4,5-dimethylcatechols;
2,3-dihydroxynaphthalene;
o-Hydroxybenzenethiol;
Protocatechualdehyde (3,4-dihydroxybenzaldehyde);
3-methoxy-4,5-dihydroxybenzaldehyde;
3- and 4-chlorocatechols: 3,4,5-trichlorocatechols;
the corresponding mono- and tribromocatechols;
3-nitro- and 4-nitrocatechols, and the like.

Conversion of the compound IV to the compound I requires substantially alkaline conditions since not the actual grouping of Formula IV, but anions derived from it, i.e., anions having a grouping of the formula:

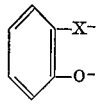

are the true reagents with the methylene dihalide. Alkali metal hydroxides are suitable substances for forming these anions in situ when dimethyl sulfoxide or sulfolane are the solvents. However, the water liberated in the formation of the anion by sodium hydroxide can in some cases cause undesirable hydrolysis of the solvent, and it is therefore often preferable to use the pre-formed di(alkali metal) derivative—for example the disodium derivative—of the compound of Formula IV, or a base (for example sodium hydride) which does not produce deleterious by-products.

Suitable methylene dihalides include methylene dichloride, methylene dibromide and methylene chlorobromide. Methylene dichloride is preferred.

According to the invention, conversion of the compound IV to the compound I is conducted in the presence of a "highly polar" "aprotic" liquid as solvent and reaction medium.

By "highly polar" liquid is meant a compound that is liquid and has a dielectric constant, measured at 25° C., of at least 25. The term "aprotic" as used herein denotes a liquid which is free from hydrogen atoms and are able to form hydrogen bonds with anions. Thus, alcohols and the hydroglycols do not come within this definition since the hydrogen atom of the hydroxyl group(s) form a hydrogen bond with the negative oxygen atom of the catechol anion. Suitable liquids comprise aromatic, aliphatic and cycloaliphatic radicals having electrophilic substituents which lend them their dielectric properties, or mixtures thereof. Particularly preferred electrophilic substituents are the nitrile radical —CN, the nitro radical —NO₂, the amido radical

the sulfoxyl radical

and the sulfone radical

Exemplary of such compounds are N,N-dimethylformamide, N,N-dimethylacetamide, acetonitrile, propionitrile, succinonitrile, crotonitrile, butyronitrile, nitrobenzene, benzonitrile, nitrotoluene, dimethylsulfone, as well as tetrahydrofurane and sulfolane. The preferred solvents are the N,N-(lower alkyl)carboxamides and the di(lower alkyl) sulfoxides, the most desirable being those wherein each of the alkyl groups, which may be the same or different, contain from 1 to 4 carbon atoms.

Most suitable as highly polar, aprotic solvents are dimethyl formamide, dimethyl acetamide, dimethyl sulfoxide and sulfolane, and of these dimethyl sulfoxide or an analogue thereof is preferred.

Preferably, the highly polar liquid used is a solvent for the reactants and reaction product and sufficient liquid is used to maintain the reaction mixture as a readily fluid solution. In cases where one or both of the reactants and/or the product is not readily and completely soluble in the liquid, sufficient liquid should be used to maintain the reaction mixture in a readily fluid condition. As has already been pointed out, within limits, greater dilution results in higher yields of product, but requires longer reaction times. Based upon all of these considerations, it is desirable to employ at least two parts by weight of the highly polar liquid per part by weight of the aromatic reactant. Preferably the weight ratio, liquid/aromatic reactant, is at least 4/1, with optimum results ordinarily being obtained when the ratio is from about 5:1 to about 15:1. A liquid/aromatic reactant ratio in excess of about 20/1 is generally unnecessary and undesirable as unduly extending the time required to effect the desired conversion.

Generally speaking, about stoichiometric quantities of the reactants are employed—that is, about one mole of methylene dihalide and two moles of base per mole of aromatic reactant charged. In some cases, it may be desirable to employ a slight to moderate excess—for example 5–50% excess of the base and/or the methylene halide to insure completion of the reaction.

The reaction is conveniently conducted at temperatures of about 80–160° C., temperatures of 100–140° C. generally being most suitable.

Although the enhanced speed of reaction in the highly polar, aprotic solvent makes it possible to effect the reaction in the minimum time, if the optimum yield of product is also desired it is preferable for the concentration of

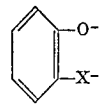

ions in the solvent not to exceed 1 molar. Preferably the concentration of these ions is maintained as low as possible by slowly adding the catechol or hydroxybenzenethiol to the reaction mixture. During the course of this slow addition the ions react as they are formed, and are therefore always present in a very high dilution. When the alkaline conditions needed for the reaction are provided by the addition of an alkali metal hydroxide to the reaction mixture, it is usually most convenient and satisfactory to add the catechol or hydroxybenzenethiol and the alkali metal hydroxide separately, simultaneously and slowly to a solution of methylene chloride in the highly polar, aprotic solvent.

The following examples illustrate application of the process of the invention in particular instances. In these examples, parts by weight (w.) bear the same relation to parts by volume (v.) as does the kilogram to the litre.

Example I.—Preparation of methylenedioxybenzene (a) Catechol (11 w.) and methylene chloride (10 w.) were dissolved in dimethyl sulfoxide (40 v.). Powdered sodium hydroxide (8.3 w.) was added and the mixture was heated in a nitrogen atmosphere and under a reflux condenser in a bath at 120° C. The reaction was vigorous. After 10 minutes steam was passed in and steam distillation carried out. The distillate was saturated with salt and extracted with light petroleum (B.P. 40–60° C.). The petroleum layer was washed with aqueous sodium hydroxide and then distilled. Methylenedioxybenzene 5.6 w., 46% yield, was collected at 173–175° C./760 torr as a colorless oil, index of refraction ($n_D^{21}$): 1.5377.

Analysis (percent by weight).—Found: C, 68.5; H, 4.7. $C_7H_6O_2$ requires: C, 68.8; H, 4.9.

(b) The reaction was carried out as above using 100 v. of dimethyl sulfoxide. The heating time was 30 minutes. Methylenedioxybenzene was obtained, 8.35 w., 68% yield.

(c) The reaction was carried out as in (a) above using 150 v. of dimethyl sulfoxide. The heating time was 70 minutes. Yield 8.9 w., 73%.

(d) The reaction was carried out as in (a) above using sulfolane (40 v.) in place of dimethyl sulfoxide. The heating time was 3½ hours. Yield 4.1 w., 34%.

(e) Disodium catechol was prepared by the addition of sodium (4.6 w.) to catechol (11 w.) in methanol (50 v.) followed by evaporation at low pressure at 100° C. To the dry residue in nitrogen, was added a solution of methylene chloride (9 w.) in dry dimethyl formamide (50 v.). The mixture was stirred and boiled under reflux for one hour. Steam was passed in and the product distilled with the steam. The distillate was saturated with salt (NaCl) and extracted with light petroleum (B.P. 40–60° C.). The petroleum layer was washed with aqueous sodium hydroxide and then distilled. 6.55 w. of methylenedioxybenzene was obtained. Yield 54%.

(f) Dimethyl sulfoxide (500 v.) and methylene chloride (100 v.) were heated at 125–130° C. under nitrogen, in an apparatus designed to allow the addition of solid materials separately and simultaneously.

Catechol pellets (110 w. in 5.5 w. portions) and sodium hydroxide pellets (83 w. in 4.15 w. portions) were added at 5 minute intervals, the total addition time being 105 minutes. The reaction mixture was stirred well throughout and the internal temperature was maintained at 125–130° C.

Twenty minutes after the addition of catechol and sodium hydroxide was complete, further portions of methylene chloride (20 w.) and sodium hydroxide (3 w.) were added at 125–130° C. The reaction was stirred at this temperature for a further 70 minutes and then the solids addition head was replaced by a Vigreux column and a constant take-off distillation head. Water (50 v.) was added and the methylenedioxybenzene/water azeotrope was distilled off at 98–100° C., more water being added slowly to the reaction mixture as distillation proceeded.

Methylenedioxybenzene no longer separated from the distillate after approximately 600 v. of distillate had been collected. Distillation of the residue then recovered dimethyl sulfoxide (490 v.).

The methylenedioxybenzene layer was separated and the aqueous layer extracted with ether (3×50 v. portions). The combined methylenedioxybenzene and ether extract was dried and distilled. The yield of methylenedioxybenzene was 91%, B.P. 173–175° C./760 torr.

Example II.—Preparation of 1-methyl-3,4-methylenedioxybenzene

The reaction was carried out as in Example I(c) using 4-methylcatechol (12.4 w.) and a heating time of 2 hours 9.5 w. of 1-methyl-3,4-methylenedioxybenzene, B.P. 196–197° C., at 753.3 torr, index of refraction ($n_D^{20}$): 1.5308, was obtained. Yield 70%.

Analysis (percent by weight).—Found: C, 70.4; H, 5.9. $C_8H_8O_2$ requires: C, 70.6; H, 5.9.

Example III.—Preparation of 1-isopropyl-2,3-methylenedioxybenzene

The reaction was carried out as described in Example I(c) using 3-isopropylcatechol (15.2 w.) and a heating time of 2 hours. 30.1 w. of 1-isopropyl-2,3-methylenedioxybenzene, B.P. 98° C. at 14 torr, index of refraction ($n_D^{20}$): 1.5181, was obtained. Yield 80%.

Analysis (percent by weight).—Found: C, 72.9; H, 7.2. $C_{10}H_{12}O_2$ requires: C, 73.1; H, 7.4.

Example IV.—Preparation of 1-methyl-2,3-methylenedioxy-5-(1,1,3,3-tetramethylbutyl)benzene To a solution of 3-methyl-5-(1,1,3,3-tetramethylbutyl)-catechol (11.8 w.) and methylene chloride (5 w.) in dimethyl sulfoxide (75 v.) was added powdered sodium hydroxide (4.2 w.). The mixture was heated in nitrogen and under reflux ta 120° C. for 2 hours. To the cooled mixture a little water was added and the oil which separated was extracted with light petroleum (3×50 v.). The petroleum extract was twice washed with dilute sodium hydroxide and was then distilled. 9.2 w. of 1-methyl-2,3-methylenedioxy-5-(1,1,3,3-tetramethylbutyl)benzene, B.P. 162° C. at 14 torr, index of refraction ($n_D^{20}$): 1.5139, was obtained as a colorless slightly viscid oil. Yield 74%.

Analysis (percent by weight).—Found: C, 77.3; H, 9.6. $C_{16}H_{24}O_2$ requires: C, 77.4; H, 9.7.

Example V.—Preparation of piperonal (3,4-methylenedioxybenzaldehyde)

The reaction was carried out as in Example I(f) using protocatechuic aldehyde (13.8 w.) and the product was isolated from the reaction mixture by steam distillation. Piperonal was isolated in 61% yield and was identified by comparison with an authentic sample.

Example VI.—Preparation of 2,3-methylenedioxynaphthalene

The reaction was carried out as in Example I(f) using 2,3-dihydroxynaphthalene (16 w.) and the product was isolated by extracting the reaction mixture with ether. 16.3 w. of 2,3-methylenedioxynaphthalene was isolated, M.P. 99–100° C. Yield 94%.

Analysis (percent by weight).—Found: C, 76.4; H, 4.6. $C_{11}H_8O_2$ requires: C, 76.7; H, 4.7.

Example VIII.—Preparation of 1,3-benzoxathiole

The reaction was carried out as in Example I(f) using orthohydroxybenzenethiol (6.3 w.) and the product was isolated by extracting the reaction mixture with ether.

1.6 w. of 1,3-benzoxathiole was obtained, B.P. 114–117° C./19 torr. Yield 23%.

Analysis (percent by weight).—Found: C, 61.0; H, 4.5; S, 23.0. $C_7H_6OS$ requires: C, 60.8; H, 4.4; S, 23.2.

I claim as my invention:

1. In the process wherein an anion having the essential structure represented by the formula

wherein X represents oxygen or sulfur, is reacted with a methylene dihalide under alkaline conditions to form a compound having the essential structure represented by the formula:

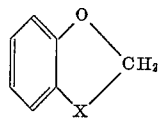

the improvement comprising conducting said reaction in the presence of an aprotic liquid having a dielectric constant, measured at 25° C., of at least 25, said anion being in solution in said aprotic liquid at a concentration not exceeding one molar and the weight ratio of said aprotic liquid to said anion being at least 2/1.

2. The improvement according to claim 1 wherein the methylene dihalide is methylene dichloride.

3. The improvement according to claim 1 wherein the aprotic liquid is one of dimethyl formamide, dimethyl acetamide, dimethyl sulfoxide and sulfolane.

4. The improvement according to claim 3 wherein the aprotic liquid is dimethyl sulfoxide.

5. The improvement according to claim 1 wherein said weight ratio of aprotic liquid to anion is from 5/1 to 15/1.

6. The improvement according to claim 5 wherein the methylene dihalide is methylene dichloride and the aprotic liquid is dimethyl sulfoxide.

7. In the process of preparing 3,4-methylenedioxybenzaldehyde by reacting 3,4-dihydroxybenzaldehyde with a methylene dihalide under alkaline condition, the improvement comprising conducting said reaction in the presence of the aprotic liquid having a dielectric constant, measured at 25° C., of at least 25, said 3,4-dihydroxybenzaldehyde being in solution in said aprotic liquid at a concentration not exceeding one molar and the weight ratio of said aprotic liquid to said 3,4-dihydroxybenzaldehyde being at least 2:1.

8. The improvement according to claim 7 wherein the methylene dihalide is methylene dichloride and the aprotic liquid is dimethyl sulfoxide.

References Cited

UNITED STATES PATENTS 2,979,513   4/1961   Smith _____ 260—327

OTHER REFERENCES

Advances in Organic Chemistry, Interscience Publishers, vol. 5 (1965), rec'd in P.O. Library, Dec. 2, 1965, pp. 2, 3, 10, 26, 28 and 36.

JAMES A. PATTEN, Primary Examiner.

U.S. Cl. X.R.

260—340.5